(12) United States Patent
Yousef et al.

(10) Patent No.: US 12,155,710 B2
(45) Date of Patent: *Nov. 26, 2024

(54) METHOD FOR BROADCASTING STREAMING CONTENTS IN A PEER-TO-PEER NETWORK

(71) Applicant: Streamroot, Broomfield, CO (US)

(72) Inventors: Hiba Yousef, Paris (FR); Paul-Louis Ageneau, Paris (FR); Axel Delmas, Paris (FR)

(73) Assignee: Streamroot, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,481

(22) Filed: Jun. 23, 2023

(65) Prior Publication Data
US 2023/0336600 A1    Oct. 19, 2023

Related U.S. Application Data

(63) Continuation of application No. 17/472,735, filed on Sep. 13, 2021, now Pat. No. 11,689,596, which is a
(Continued)

(30) Foreign Application Priority Data

Mar. 27, 2019  (FR) ...................................... 1903195

(51) Int. Cl.
*H04L 65/613*    (2022.01)
*H04L 49/9005*   (2022.01)
(Continued)

(52) U.S. Cl.
CPC ........ *H04L 65/613* (2022.05); *H04L 49/9005* (2013.01); *H04L 65/60* (2013.01);
(Continued)

(58) Field of Classification Search
CPC ..... H04L 41/12; H04L 45/745; H04L 65/613; H04L 65/611; H04L 49/9005; H04L 65/60; H04L 65/80; H04L 67/104
See application file for complete search history.

(56) References Cited

U.S. PATENT DOCUMENTS 11,128,685 B2   9/2021  Yousef
2011/0255535 A1   10/2011  Tinsman
(Continued)

FOREIGN PATENT DOCUMENTS

WO   WO-2012153173   11/2012
WO   WO-2012154287   11/2012
(Continued)

OTHER PUBLICATIONS

Australian Examination Report, dated Oct. 29, 2021, Application No. 20200245087, filed Mar. 27, 2020, 3 pgs.
(Continued)

*Primary Examiner* — Glenton B Burgess
*Assistant Examiner* — Jihad K Boustany

(57) ABSTRACT

The present invention relates to a method for streaming, on a player of a client device (11), a broadcast content within a peer-to-peer network (10) of client devices (11, 12), said content consisting of a sequence of segments available in a plurality of levels of quality and said player being adapted to choose the level of quality of the segments in accordance with an adaptive bitrate ABR regulation logic; the client device (11) comprising a first buffer (M1) adapted to store segments in a format suitable for transfer within the peer-to-peer network (10), the method being characterized in that it comprises the implementation, by data processing means (110) of the device (11), of steps of:
(Continued)

a. Receiving a request for a segment from the player;
b. Providing, in response, said segment from the first buffer (M1) upon expiry of a response deadline defined with respect to said ABR logic of the player.

10 Claims, 2 Drawing Sheets

Related U.S. Application Data continuation of application No. 16/832,088, filed on Mar. 27, 2020, now Pat. No. 11,128,685.

(51) Int. Cl.
   *H04L 65/60* (2022.01)
   *H04L 65/611* (2022.01)
   *H04L 65/80* (2022.01)
   *H04L 67/104* (2022.01)

(52) U.S. Cl.
   CPC ............ *H04L 65/611* (2022.05); *H04L 65/80* (2013.01); *H04L 67/104* (2013.01)

(56) References Cited

U.S. PATENT DOCUMENTS

| | | |
|---|---|---|
| 2012/0254456 A1 | 10/2012 | Visharam |
| 2013/0024583 A1* | 1/2013 | Kim .................... H04N 21/236 709/231 |
| 2013/0058480 A1 | 3/2013 | Ziskind |
| 2014/0025830 A1 | 1/2014 | Grinshpun |
| 2015/0067722 A1 | 3/2015 | Bjordammen |
| 2015/0172352 A1 | 6/2015 | Gopalakrishnan |
| 2015/0341812 A1 | 11/2015 | Dion |
| 2016/0182941 A1 | 6/2016 | Crabtree |
| 2016/0192029 A1* | 6/2016 | Bergstrom ............ H04L 47/823 709/219 |
| 2016/0234078 A1 | 8/2016 | Rittwik |
| 2016/0285939 A1 | 9/2016 | Behbahani |
| 2016/0294898 A1 | 10/2016 | Wheelock |
| 2017/0272783 A1 | 9/2017 | Bachmutsky |
| 2018/0138998 A1 | 5/2018 | Delmas |
| 2018/0288458 A1 | 10/2018 | Kolekar |
| 2018/0316740 A1 | 11/2018 | Stockhammer |
| 2020/0036766 A1* | 1/2020 | Mahvash ......... H04N 21/23439 |
| 2020/0099733 A1* | 3/2020 | Chu .................... H04N 21/8456 |
| 2020/0204842 A1* | 6/2020 | Kapchits ............ H04N 21/2402 |
| 2020/0351317 A1 | 11/2020 | Yousef |
| 2022/0021719 A1 | 1/2022 | Yousef |
| 2022/0171864 A1 | 6/2022 | Barday |

FOREIGN PATENT DOCUMENTS

| | | |
|---|---|---|
| WO | WO-2015191177 | 12/2015 |
| WO | WO-2016199098 | 12/2016 |

OTHER PUBLICATIONS

Korean Notification of Reason for Refusal, dated Jan. 13, 2022, Application No. 10-2021-7035076, filed Mar. 27, 2020, 5 pgs.
Singapore Invitation to Respond to Written Opinion, dated May 6, 2022, Application No. 11202110647Q, filed Mar. 27, 2020, 10 pgs.

* cited by examiner

METHOD FOR BROADCASTING STREAMING CONTENTS IN A PEER-TO-PEER NETWORK

CROSS-REFERENCE TO RELATED APPLICATIONS

This application claims benefit of Serial No. 1903195, filed 27 Mar. 2019 in France and which application is incorporated herein by reference. To the extent appropriate, a claim of priority is made to the above disclosed application.

GENERAL TECHNICAL FIELD

The present invention relates to a method for broadcasting a streaming content in a peer-to-peer network.

STATE OF THE ART

Streaming means a technique for playing an audio or video stream "in live" that is to say as it is retrieved from the Internet by a client device. It is thus opposed to the download which requires retrieving all the data from the audio or video content before it can be played.

In the case of the streaming, the storage of the content is temporary and partial, the data being continuously downloaded into a client buffer (typically the random access memory), decoded on the fly, sent to an output interface (a screen and/or speakers) and then replaced with new data.

Conventionally, the content is made available on a streaming server. The client wishing to access it sends a request to retrieve the first segments therefrom (by segment is meant a block of the data of the content, generally corresponding to a few seconds of playback). When there is enough data in the buffer to allow playing the beginning of the content, the playback starts. In the background, the download of the stream continues in order to constantly feed the buffer with the rest of the content.

However, it is noted that this approach has its limits if a large number of clients wish to play the same content simultaneously: the server becomes saturated, unable to provide the content at a bitrate sufficient for the playback to be smooth, and jerks appear. An alternative strategy based on the peer-to-peer (P2P) has been recently proposed, in which each client acts as a server for other clients: this is called peers. A peer which has started playing the content can retransmit the segments it has already received to others, and so on, hence an ease of broadcasting regardless of the number of interested clients. This strategy is described for example in the international application WO 2012/154287 and brings satisfaction.

However, most players implement a logic known as Adaptive BitRate (ABR) logic and this proves to be problematic when combined with the P2P.

The general idea of the ABR is to allow the automatic variation of the quality of the retrieved segments according to the "capacities" of a peer. More precisely, each segment is available at several levels of quality corresponding to several bitrates, i.e. data rates. It is indeed understood that a segment of better quality has better resolution, less compression, more frames per second, etc., and is therefore larger than the same segment of lower quality, and it is therefore necessary to maintain a higher data rate.

The ABR aims at automatically determining, for each segment, the best quality that can be chosen, generally in view of two criteria which are the observed bandwidth and/or the filling rate of the buffer.

In the first case, if the algorithm judges that the estimated bandwidth is sufficient to withstand a higher quality, then it will instruct the client to switch to this quality (or conversely to lower the quality if the bandwidth is too low). In the second case, the principle is to divide the buffer into different intervals, each interval corresponding to an increasingly higher quality as the filling of the buffer increases (increasingly lower if it decreases).

In both cases, if the ABR algorithms have no fundamental incompatibility to be used in a P2P streaming context, the problem is that the ABR algorithms have been designed to work in a simple streaming scenario, i.e. with all the segments retrieved on request from the content server.

However, in practice, the P2P streaming performs "pre—buffering", by downloading P2P segments in a dedicated P2P cache before the player actually requests it. Indeed, the objective of the P2P streaming is to request as little as possible (and as a last resort) the original content server: a direct request for a segment to this server is only made if there is a risk that there are no more segments in the video buffer and if the playback is interrupted ("re—buffering"), otherwise there is a maximum reliance on the P2P network. There will be therefore, from the point of view of the player, extremely high apparent bandwidths since segments can be loaded into the buffer from the P2P cache a fraction of a second after they have been requested. In addition, the filling rate of the video buffer is artificially high.

This causes uncontrolled decisions of the ABR to increase the quality if the current quality is not the maximum quality, regardless of the actual capacity of the network, quality that it may not necessarily be able to withstand.

There will be therefore at best unstable fluctuations in the quality of the stream, at worst repeated interruptions of the playback and numerous and unnecessary requests from the content server.

It would be desirable to be able to control the ABR logic, but unfortunately it is often specific to the player and not very accessible, and even less modifiable. It would therefore be desirable to have a way of controlling any ABR algorithm in a P2P streaming context. The present invention improves the situation.

PRESENTATION OF THE INVENTION

The present invention thus relates to a method for streaming, on a player of a client device, a broadcast content within a peer-to-peer network of client devices, said content consisting of a sequence of segments available in a plurality of levels of quality and said player being adapted to choose the level of quality of the segments in accordance with an adaptive bitrate ABR regulation logic; the client device comprising a first buffer adapted to store segments in a format suitable for transfer within the peer-to-peer network, the method being characterized in that it comprises the implementation, by data processing means of the device, of steps of:

(a) Receiving a request for a segment from the player,
(b) Providing, in response, said segment from the first buffer upon expiry of a response deadline defined with respect to said ABR logic of the player.

This method cleverly proposes feedback information to the ABR algorithm by adding an artificial deadline to the response.

According to advantageous and non-limiting characteristics:

said ABR logic is defined by a first function making it possible to calculate a level of quality in which said segment is required as a function of at least one parameter representative of a segment reception rate;

a second function makes it possible to calculate in step (a) said response deadline as a function of said at least one parameter representative of a segment reception rate; the second function is constructed from the first function;

the second function is monotonic compared to said at least one parameter representative of a segment reception rate;

the device further comprises a second buffer adapted to store segments in a format suitable for playback by the player, said segment being provided in step (b) in the second buffer;

said parameter representative of a segment reception rate is a filling level of the second buffer and/or a bandwidth;

step (a) comprises the prediction of a level of quality in which the next segment will be required as a function of the calculated response deadline;

the method comprises a step (c) of verifying said prediction of a level of quality in which the next segment will be required;

the method comprises the learning of the second function on the basis of the predicted and actually required levels of quality;

the required segment is available in incomplete form in the first buffer, step (a) comprising the modification of the calculated response deadline as a function of an estimated duration necessary to finish retrieving the segment, the segment being provided in complete form in step (b) at the earliest upon expiry of the modified response deadline.

According to a second aspect, the invention proposes a device for streaming, on a player, a broadcast content within a peer-to-peer network of client devices, said content consisting of a sequence of segments available in a plurality of levels of qualities and said player being adapted to choose the level of quality of the segments in accordance with an adaptive bitrate ABR regulation logic; the client device comprising a first buffer adapted to store segments in a format suitable for transfer within the peer-to-peer network and data processing means, the device being characterized in that the data processing means are configured, following the reception of a request for a segment from the player, to provide, in response, said segment from the first buffer upon expiry of a response deadline defined with respect to said ABR logic of the player.

According to a third and a fourth aspect, the invention proposes a computer program product comprising code instructions for the execution of a method, according to the first aspect, for broadcasting a streaming content in a peer-to-peer network of client devices connected to a content server; and a storage means playable by a computer device on which a computer program product comprises code instructions for the execution of a method, according to the first aspect, for broadcasting a streaming content in a peer-to-peer network of client devices connected to a content server.

PRESENTATION OF THE FIGURES

Other characteristics and advantages of the present invention will appear upon reading the following description of a preferred embodiment. This description will be given with reference to the appended figures wherein.

DETAILED DESCRIPTION

Architecture

Figure 1:
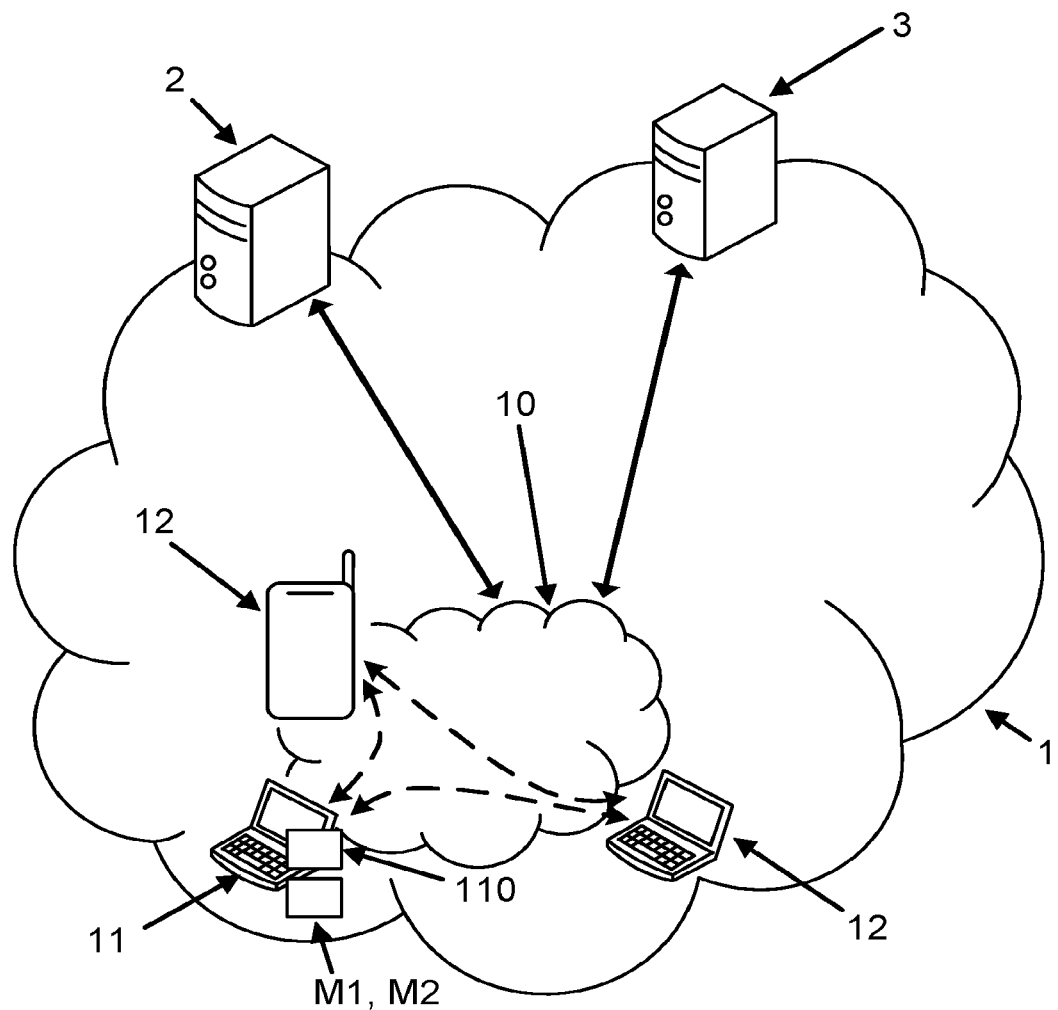
FIG. 1 represents an architecture for the implementation of the method according to the invention.

Referring to FIG. 1, the invention proposes a method for streaming a broadcast content within a network 1 as represented. The network 1 is here a large-scale telecommunications network and particularly Internet. This network 1 comprises a peer-to-peer network 10 of client devices 11, 12. Each client device 11, 12 is typically a personal computer device such as a PC, a smartphone, a tablet, etc. connected to the network 1, having data processing means 110 such as a processor, an interface for the playback of the content, and data storage means such as a random access memory and/or a mass memory.

The playback is implemented by a player, that is to say an application executed by the data processing means 110, which can be of a varied nature, for example a dedicated application, an internet browser particularly compatible with HTML5, a module of the operating system, etc.

It will be assumed in the following description that the player is "as it stands", that is to say it is not modified for the implementation of the present method, or even for the P2P streaming. Particularly, the player implements adaptive bitrate ABR regulation logic, that is to say said content to be played consists of a sequence of segments available in a plurality of qualities and the player is capable of deciding autonomously which quality to require, in accordance with this ABR logic. The various qualities correspond to different bitrates, that is to say a variable volume of data per time unit (and thus per segment). It is naturally understood that better quality content requires a higher bitrate.

More will be said in more detail about the concept of ABR logic below, it will only be understood that in the context of the present method it is not necessary for the ABR logic to be controlled or even known: the present method is completely universal and can be adapted to any player implementing any ABR logic on the basis of any criteria. It will be assumed that the ABR logic is predefined and that the client software (see below) only undergoes it.

Furthermore, the device 11 (and more precisely its data storage means) have two buffers M1 and M2 (also called "buffer"), typically two areas of a random access memory, each of which can store (in a different way as will be seen) all or part of the content temporarily (by temporary, is meant that the segments are deleted from this memory shortly after they have been played: they are not stored in the long term as it is the case for a direct download). For example, in the case of playback via a browser, all the segments are typically deleted (i.e. the buffers are reset) at the latest when the browser or the tab in which the video is played is closed.

The first buffer M1 is called "peer-to-peer cache". It stores the segments in a format called "raw" format. By raw segments is meant in a format suitable for transfer within the peer-to-peer network 10, but unsuitable for playback on the device 11.

The second buffer M2 is called "video buffer". It is controlled by the player and stores the segments in a format called "converted" format. By converted segments is meant converted from raw segments in a format suitable for playback (and particularly for the player) on the device 11, but unsuitable for transfer within the peer-to-peer network 10, see below.

As explained in the introduction, the devices 11, 12 are "peers" (also called "nodes") of the peer-to-peer network 10.

By "client devices 11, 12 of a peer-to-peer network 10" is meant devices connected in the network 1 by a peer-to-peer network protocol. In other words, the data processing means of each peer implement a particular program (client software, called "Peer-agent", PA), which can be for example integrated to the player (for example an extension of a web browser), be the subject of a dedicated application, or even be incorporated into any other on-board software (for example a player from an Internet access box or a multimedia box, i.e. a "set-top box"), for the use of the peer-to-peer. The present method is mainly implemented via this client software. In the remainder of the present description, client software in communication with the player will be assumed so as to provide it with segments, but operating independently. More precisely, it is understood that the role of the player is the playback itself, i.e. the rendering of the segments, while the role of the client software is simply obtaining the segments for the player, the client software undergoing the operation of the player and particularly its ABR logic.

As explained, a peer-to-peer or P2P network is a decentralized sub-network within the network 1, in which data can be transferred directly between two client devices 11, 12 of the network 10, without passing through a central server. It thus allows all client devices 11, 12 to act both as client and server. The peers 11, 12 are thus defined as "seeders" (that is to say data providers) and/or "leechers" (that is to say data recipients).

Said content, which is particularly audio or video content, that is to say a medium of certain duration, consists of a sequence of segments (called playlist) stored on means for storing data of a server 2 connected to the peer-to-peer network 10, and as explained available in several levels of quality. The segments have a predetermined length, typically one or two seconds of the content, but it can range from a fraction of a second to about ten seconds. All the segments of a given content have generally the same length, which will be noted here p.

The server 2 is a content server (called CDN), advantageously present in the network 1 and connected to the peer-to-peer network 10. In other words, this is one (or more) servers of the internet network 1 providing the segments of various contents in accordance with a given streaming protocol. HLS (HTTP Live Streaming) can be mentioned as example, in which the segments are "ts" files, listed in a "m3u8" playlist file. HLS implies the MPEG2 format for the content. the DASH, Smooth streaming or HDS streaming protocols will also be mentioned. The raw segments can be exchanged between peers via a WebRTC-type protocol.

The server 2 is the primary source of the segments, insofar as initially no peer has the content (before a first transfer from the server 2 to this peer 11, 12). The contents are either from the outset stored in their entirety on the server 2 (case of the VOD previously mentioned), or generated in real time (case of the live streaming), and in the latter case the list of segments which constitute them evolves dynamically.

The Live Streaming proposes broadcasting in real time contents associated with "live" events, for example concerts, conferences, sports events, video game plays, etc., which are taking place simultaneously. Compared to the streaming of an already fully existing content such as a movie, a broadcast content in Live streaming is indeed generated as the associated event takes place. Technically, as it is the case of a live broadcast on television, such content can only be broadcasted with a slight delay, which the user wants as low as possible. This delay is typically of the order of a minute, but can go down to around twenty seconds. This makes that a playlist of only a handful of segments (at most a few dozen) is available at any time, the segments of this list being dynamically renewed on a shift basis: as the event takes place, new segments are created, "age", are received and played by the clients (at the end of the expected delay), and finally leave the list.

In the latter case (live streaming), the content should rather be seen as a continuous stream. The sequence of segments is thus dynamic, that is to say it is updated on a regular basis. Each time a new segment is generated, it is added at the end of the sequence, and the first segment of the sequence (the oldest one) is deleted. All the others shift according to a shift mechanism that can be compared to a FIFO list. The first segment of the list (the oldest one) can be the one at the play point, in other words the segment "live" (and therefore the segments are removed from the playlist as soon as they are played), or a segment "past" if the content server accepts that the content is played with a delay (some platforms propose live streaming with a delay of up to 2 hours), this is called the DVR (Digital video recorder).

The present method can be implemented in any context.

A peer management server 3 called "tracker" is also advantageously connected to the peer-to-peer network 10. The tracker 3 has data processing means and storage means.

It coordinates the exchanges between peers 11, 12 (by controlling the client software implemented by each of the client devices 11, 12), but it is not directly involved in the data transfer and does not have a copy of the file.

ABR

As mentioned, there are two main types of ABR logics, based respectively on the bandwidth (i.e. the observed data rate) and on the filling level (either in value, i.e. in seconds or in number of segments, or in rate) of the second buffer M2 (possibly in combination). In other words, the player monitors the bandwidth and/or the filling rate/volume of the second buffer M2, and consequently makes decisions as to whether the quality level of the required segments should be modified or not.

Figure 2:
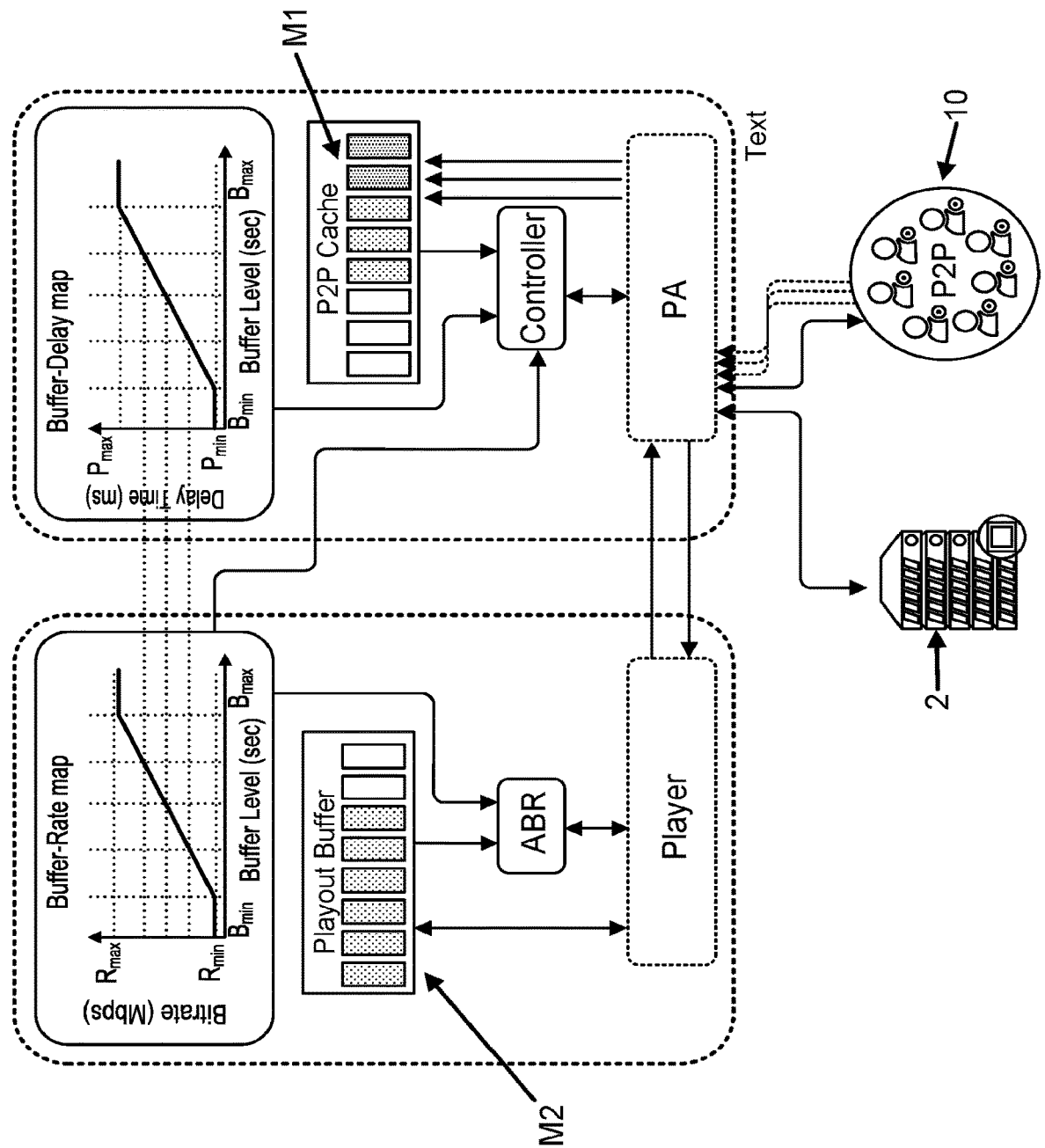
FIG. 2 illustrates a preferred embodiment of the method according to the invention.

Generally, in either case, the ABR logic can be defined by means of a first function making it possible to calculate the level of quality to be chosen (the bitrate) as a function of at least one parameter representative of a segment reception rate, see for example the curve as represented in FIG. 2 (left part, which represents the player side, the right part illustrating the client software side).

It is understood that said parameter representative of a segment reception rate is a monitored parameter, which can be any parameter illustrating the ability of the device 11 and/or of the network 10 to receive the segments "fast enough". As explained previously, the known ABR logics generally use as a parameter a filling level of the second buffer M2 and/or a bandwidth.

Whatever the type of ABR logic, said first function is monotonic, particularly increasing, between a minimum quality value and a maximum quality value. A preferred model is that of a continuous piecewise function, with three pieces (connected at two singular points), including a first and a third constant piece.

Thus, in the example of FIG. 2 (left part), the example of an ABR logic based on the filling level of the second buffer M2 (expressed in seconds) is represented, and it is seen that:

for a filling level lower than or equal to a minimum threshold $B_{min}$, the bitrate is set equal to the minimum bitrate $R_{min}$ (in other words the buffer is dangerously empty, which is representative of difficulties in obtaining segments, and then the quality is minimal to promote the re-filling);

for a filling level higher than or equal to a maximum threshold $B_{max}$, the bitrate is set equal to the maximum bitrate $R_{max}$ (the buffer is full therefore there is no risk of affording the maximum quality);

between the two, there is an increasing, preferably linear, curve—in the example of FIG. 2 it has the equation $R=R_{min}+(B-B_{min})*(R_{max}-R_{min})/(B_{max}-B_{min})$—which means that the fuller the buffer, the higher the quality.

A similar curve is obtained for an ABR logic based on the bandwidth.

As will be seen below, the present method proposes to control the ABR not by altering its logic, but by deceiving it by means of an added response deadline before satisfying a request for the segment. Indeed, simply delaying the provision of a segment makes it possible to artificially limit the bandwidth and the filling level of the second buffer M2, and thus to act on the expected quality of the segments.

For this a second function is defined, allowing said response deadline as a function of said at least one parameter representative of a segment reception rate in the represented examples, this is therefore again the filling level of the second buffer M2).

The second function is preferably constructed (or even learned, see below) from the first function, that is to say the ABR logic can be mapped by means of the second function. Thus, according to a preferred embodiment, the second function is monotonic compared to said at least one parameter representative of a segment reception rate, and generally (in particular in the case of an ABR logic based on the filling level of the second buffer M2 which will be developed below) the first and second functions have the same monotony compared to said at least one parameter representative of a segment reception rate (particularly increasing function). Indeed the second function is most often similar to the first function of the ABR logic (again a continuous piecewise function with three pieces including two extreme segments), see for example the corresponding curve which is represented on the right side in FIG. 2.

The mapping can for example consist in taking two points from the first function, particularly the singular points connecting the pieces of coordinates $\{B_{min}, R_{min}=f_1(B_{min})\}$ and $\{B_{max}, R_{max}=f_1(B_{max})\}$ and constructing the second function on the basis of the two corresponding points $\{B_{min}, \rho_{min}=f_2(B_{min})\}$ and $\{B_{max}, \rho_{max}=f_2(B_{max})\}$. Preferably, the second function is constructed with the same monotony as the first function, particularly a continuous piecewise function with three pieces connected via said two points.

In the example of FIG. 2 on the right, the second function is thus constructed as follows:

for a filling level lower than or equal to the minimum threshold $B_{min}$, the response deadline is set to a minimum value $\rho_{min}$, preferably zero, i.e. no deadline is added (in other words the buffer is dangerously empty, and there is no risk in directly providing the received segments);

for a filling level higher than or equal to a maximum threshold $B_{max}$, the response deadline is set equal to a maximum value $\rho_{max}$, preferably the length p of a segment (this makes it possible not to further increase the filling rate of the video buffer, the P2P cache keeps margin by providing a new segment only when a previous segment has been fully played);

between the two, there is an increasing, preferably linear, curve—in the example of FIG. 2 it has the equation $\rho=\rho_{min}+(B-B_{min})*(\rho_{max}-\rho_{min})$—which means that the fuller the buffer, the longer the response deadline, so as to prevent a further increase in this filling rate.

Note that it is also possible that the first and second functions have reverse monotony compared to said at least one parameter representative of a segment reception rate (that is to say the second function is increasing when the first function is decreasing, and vice-versa), this is in particular the case if the ABR logic is based on the bandwidth (then the first function is increasing and the second function is decreasing).

The present method will not be limited to a given response deadline application strategy, and those skilled in the art will be able to adapt the idea to the ABR logic, to the type of parameter monitored by the player, to the behavior of the P2P network, etc. In general, it will be understood that it suffices to construct a second function defining the response deadline from the first function defining the ABR logic.

Playback

In the remainder of the present description, focus is made on a client device 11 which is where appropriate in the process of retrieving the content from other devices 12 and/or the server 2, that is to say the first buffer M1 already stores at least one raw segment, in at least one level of quality, if possible a sub-sequence of the sequence constituting the content.

The method then begins with the implementation by the processing means 110 the device of a step (a) of receiving a request for a segment, in this case for the next segment to put in the second buffer M2 (not necessarily the next segment to play, there are normally buffered advance segments). Said request is received from the player, and preferably defines the level of quality in which the segment is required, i.e. the bitrate (by application of the ABR logic).

It is assumed that said segment is at this stage at least partially available (i.e. at least one fragment) in the first buffer M1, in the quality required by the player. If this segment/segment fragment was of another quality, it should be retrieved again, generally directly from the content server 2 because there is not enough time.

As explained, step (a) then advantageously comprises the calculation of a response deadline defined relative to said ABR logic of the player, particularly as a function of a parameter monitored by the ABR logic (said at least one parameter representative of a segment reception rate), preferably the filling level of the second buffer M2 and/or the bandwidth. Step (a) comprises, if necessary, the "measurement" of said parameter representative of a segment reception rate.

As explained, the second function defining the response deadline is preferably increasing with said parameter representative of a segment reception rate between a minimum response deadline value and a maximum value.

In the case where it is only a fragment of the next segment that has been retrieved (it is said that the segment is available in incomplete form), preferably the calculated response deadline is modified according to the length of the fragment so as to reflect the fact that only one fragment of the response deadline should be actually applied. Indeed, only complete segments and not fragments can be provided to the second buffer M2, and the idea is to provide the segment in complete form at the end of a short response deadline reflecting the fact that there will be already implicitly a waiting period corresponding to the time for completing (finishing to retrieve) this segment in the first buffer M1. Thus, step (a) comprises the modification of the response deadline calculated as a function of an estimated duration necessary to finish retrieving the segment.

For example, the formula ρ'=ρ—tdw could be applied where p' is the modified response deadline and tdw is the estimated duration needed to finish retrieving the segment. Thus, waiting for the time tdw plus application of ρ' before providing the complete segment is equivalent to the application ρ, so that the overall deadline remains the same.

In a step (b), said required segment is provided in response to the request, from the first buffer M1, upon expiry of said response deadline. By "provided upon expiry of said response deadline" is meant such that the player does not have it before the expiry of the response deadline (at best at the time of expiry, or even only after in some cases, see below). Most often, the segment is transmitted at once upon expiry of the response deadline, but it will be understood that it is quite possible to stream it within the device 1, i.e. to transmit it from the first buffer M1 gradually (bit by bit) so that the last bit is transmitted (at the earliest) upon expiry of the response deadline (the response deadline is then a "transmission deadline of the last bit of the segment"). Indeed, although only complete segments are playable, some players can accept sub-segments of the segment. Note that such a progressive transmission does not change anything since, as long as the segment is not fully received, it is not available by the player and therefore not considered to be provided, but makes it possible to facilitate bandwidth measurements.

In the case where only a fragment of the segment was available in the first buffer M1 and where the response deadline has been modified according to an estimated duration necessary to finish retrieving the segment, normally the segment is also provided in step (b) upon expiry of the modified response deadline. As explained, although the provision can be fragmented, sub-segments of a complete segment (which correspond to consecutive pieces of segment obtained from a completely downloaded segment) should not be confused with incomplete segment (in which only some data portions, most often corresponding to disparate pieces, have been downloaded). Only a segment available in complete form in the first buffer M1 can be provided (if necessary gradually) in response to the request (and not a fragment), so that if the download took longer than expected, the segment may be available in complete form only after expiry of the modified response deadline. Thus, the complete segment is provided at the earliest upon expiry of the modified response deadline (i.e. not before), but possibly after. In practice, the complete segment is provided when the two following conditions are satisfied: the segment is available in complete form (its download is complete), and the modified response deadline has expired.

In all cases, preferably, the segment is provided to the second buffer M2, and as such step (b) may comprise the conversion into a format suitable for playback on the device 11 of said segment of the first buffer M1. This step consists in transforming the raw segment into a converted segment, which can be played by the player of the device 11 unlike the first one.

For example, if the player is the built-in player of a browser compatible with HTML5, the conversion consists of injecting the video data of the segment using the API Media Source Extension of the browser.

Naturally, step (b) advantageously comprises simultaneously the playback of a previous segment stored in the second buffer M2, so that the segments "rotate". The segment retrieved in step (b) will be soon played in turn.

Steps (a) and (b) can now be repeated as long as the playback lasts: the application of the deadline stabilizes the ABR, and at worst, in case of change anyway in the level of quality required by the player due to a new ABR decision, the segments will now be loaded from the P2P network in accordance with the new required level of quality, so that the user won't be bothered.

Prediction

In a particularly preferred manner, step (a) further comprises the prediction of a possible next ABR decision, i.e. the prediction of the level of quality in which the next segment will be required (i.e. at the next occurrence of step (a)).

Indeed, it is possible by application of the first function, to determine before applying the calculated response deadline, whether the level of quality required by the ABR will change. It will be assumed that a complete segment, of length p, has been provided so as to facilitate the calculations. Thus, at the end of step (b), the filling level of the second memory M2 will have increased by p, that is to say the length of the segment. On the other hand, the response deadline p has elapsed, and an identical duration of the content of the second memory M2 has been played and deleted, so that the new filling level $B_n$ can be expressed relative to the previous one $B_{n-1}$ (at the time of the last provision of a segment) by the formula $B_n=B_{n-1}+ρ-ρ_n$ (it is noted that a similar calculation can be made if the parameter representative of the segment reception rate is the bandwidth). Therefore suffices to calculate $f_1$ ($B_n$) to predict the next ABR decision, and if necessary anticipate a change in the quality level and require the future segments in the right quality level (this is "pre-fetch"). Thus, the probability that the user will be bothered is even lower.

Note that the method may comprise a step (c), at the end of step (b), of verifying the prediction (if necessary confused with a next occurrence of step (a)).

More precisely, the ABR logic is relaunched to calculate a "new" required level of quality, i.e. the required level of quality for the next segment, and a corresponding request for segment will in this regard be sent to the client software. The verification simply consists in comparing the predicted level of quality with the required level of quality in practice, for the next segment.

Learning

According to a first embodiment, the first function is assumed to be known, and the second function can be pre-constructed from this first function.

However in other cases, the first function may be poorly known or not known at all if the player is completely closed.

Then, it is possible to gradually learn the first function and/or the second function, by using in particular the ABR decision prediction as a learning means: for each segment, the prediction and the decision actually made, i.e. the predicted level of quality and the actually required level of quality, which constitutes a learning loop, are compared in step (c).

It is possible to estimate the first or the second function, in particular starting from a default function, and by changing its parameters over time. For example, the first function can be parameterized via the values of the four parameters $B_{min}$, $R_{min}$, $B_{max}$ and $R_{max}$ by assuming a piecewise function with three segments, and similarly the second function can be parameterized via the values of the four parameters $B_{min}$, $\rho_{min}$, $B_{max}$ and $\rho_{max}$ by assuming a piecewise function with three segments (there is therefore a total of six variables).

Thus, on the first segments of the content, the client software will probably calculate the response deadline in an inaccurate manner, which will lead to unexpected ABR decisions and uncontrolled quality level changes, but quickly the algorithm will improve and the ABR logic will be completely under control.

Learning algorithms can be in particular used, for example neural networks.

Note that the data on the basis of which the learning is done can be kept between sessions to eliminate or limit the problems related to the learning phase during subsequent sessions. Some factors, such as a change in the version number of the player, can be used to invalidate the saved parameters and start over blank parameters for a new learning phase. Alternatively/additionally, the learned functions can be transmitted to other peers 12, for example via P2P messages, or to the peer management server 3.

Device and Computer Program Product

According to a second aspect, the invention relates to the client device 11 for the implementation of the present method for playing content, on a player adapted to choose the level of quality of the segments in accordance with adaptive bitrate ABR regulation logic.

This device 11 comprises, as explained:

A first buffer M1 temporarily storing at least one segment of content consisting of a sequence of segments, each raw segment being in a format suitable for transfer within the peer-to-peer network 10;

A second buffer M2 temporarily storing at least one converted segment of said content, in a format suitable for playback by the player; and Data processing means 110.

The data processing means 110, typically a processor, are configured to implement, following the reception of a request for a segment, the provision (to the player, typically by injection into the second buffer M2) of said segment in the first buffer M1 upon expiry of a response deadline defined with respect to said ABR logic of the player.

According to other aspects, the invention relates to a computer program product comprising code instructions for the execution (on data processing means, particularly those of the client device 11) of a method according to the first aspect of the invention for streaming, on a client device 11, a broadcast content within a peer-to-peer network 10 of client devices 11, 12, as well as storage means playable by a computer device (for example a memory of this client device 11) on which there is this computer program product.

The invention claimed is:

1. A method for streaming, on a player of a client device, a broadcast content within a peer-to-peer network of client devices, said content consisting of a sequence of segments available in a plurality of levels of quality and said player being adapted to choose the level of quality of the segments in accordance with an adaptive bitrate (ABR) regulation logic; the client device comprising a first buffer adapted to store segments in a format suitable for transfer within the peer-to-peer network, the method being characterized in that it comprises the implementation, by data processing means of the client device, of steps of:

(a) Receiving a request for a segment from the player
(b) Providing, in response, said segment from the first buffer upon expiry of a response deadline defined with respect to said ABR regulation logic of the player, wherein the segment is available in incomplete form in the first buffer step (a) comprising the modification of the response deadline as a function of an estimated duration necessary to finish retrieving the segment, the segment being provided in complete form in step (b) at the earliest upon expiry of the modified response deadline.

2. The method according to claim 1, wherein said ABR regulation logic is defined by a first function making it possible to calculate a level of quality in which said segment is required as a function of at least one parameter representative of a segment reception rate.

3. The method according to claim 2, wherein a second function makes it possible to calculate in step (a) said response deadline as a function of said at least one parameter representative of a segment reception rate.

4. The method according to claim 1, wherein the second function is constructed from the first function.

5. The method according to claim 3, wherein the second function is monotonic compared to said at least one parameter representative of a segment reception rate.

6. The method according to claim 1, wherein the device further comprises a second buffer adapted to store segments in a format suitable for playback by the player, said segment being provided in step (b) in the second buffer.

7. The method according to claim 2 in combination, wherein said parameter representative of a segment reception rate is a filling level of the second buffer and/or a bandwidth.

8. The method according to claim 3, comprising the learning of the second function on the basis of predicted and actually required levels of quality.

9. A device for streaming, on a player, a broadcast content within a peer-to-peer network of client devices, said content consisting of a sequence of segments available in a plurality of levels of quality and said player being adapted to choose the level of quality of the segments in accordance with an adaptive bitrate (ABR) regulation logic; the client device comprising a first buffer adapted to store segments in a format suitable for transfer within the peer-to-peer network and data processing means, the client device comprising the data processing means are configured, following the reception of a request for a segment from the player, to provide, in response, said segment from the first buffer upon expiry of a response deadline defined with respect to said ABR regulation logic of the player, wherein the segment is available in incomplete form in the first buffer step (a) comprising the modification of the response deadline as a function of an estimated duration necessary to finish retrieving the segment, the segment being provided in complete form in step (b) at the earliest upon expiry of the modified response deadline.

10. A non-transitory computer-readable storage means on which a computer program product comprises code instructions for the execution of a method, according to claim 1, for broadcasting a streaming content in a peer-to-peer network of client devices connected to a server.

* * * * *